(12) United States Patent
McGuire et al.

(10) Patent No.: US 10,199,969 B2
(45) Date of Patent: Feb. 5, 2019

(54) TURBOGENERATOR SYSTEM

(71) Applicant: Bowman Power Group Ltd., Southamton (GB)

(72) Inventors: Jonathon McGuire, Southamptom (GB); Shinri Szymko, Southamptom (GB)

(73) Assignee: Bowman Power Group Ltd., Southhampton (GB)

( * ) Notice: Subject to any disclaimer, the term of this patent is extended or adjusted under 35 U.S.C. 154(b) by 56 days.

(21) Appl. No.: 15/117,548

(22) PCT Filed: Feb. 13, 2015

(86) PCT No.: PCT/GB2015/050404
§ 371 (c)(1),
(2) Date: Aug. 9, 2016

(87) PCT Pub. No.: WO2015/124904
PCT Pub. Date: Aug. 27, 2015

(65) Prior Publication Data
US 2016/0352273 A1    Dec. 1, 2016

(30) Foreign Application Priority Data

Feb. 21, 2014 (GB) .................................. 1403105.8

(51) Int. Cl.
*H02P 9/00* (2006.01)
*H02P 9/04* (2006.01)
(Continued)

(52) U.S. Cl.
CPC ................ *H02P 9/04* (2013.01); *F01D 15/10* (2013.01); *F02C 6/12* (2013.01); *F02C 9/42* (2013.01);
(Continued)

(58) Field of Classification Search
CPC .......... F05D 2270/053; F05D 2270/13; F05D 2240/40; F02C 9/42; F01D 15/10; H02P 9/04
(Continued)

(56) References Cited

U.S. PATENT DOCUMENTS

| 1,670,063 | A | * | 5/1928 | Darling | ...................... | H02P 9/04 290/2 |
| 2,546,410 | A | * | 3/1951 | Schwendner | ............. | H02P 9/00 251/29 |

(Continued)

FOREIGN PATENT DOCUMENTS

| EP | 2006492 A1 | 12/2008 |
| GB | 2451703 A | 11/2009 |
| WO | 98046871 A1 | 10/1998 |

OTHER PUBLICATIONS

International Preliminary Report on Patentability from International Application No. PCT/GB2015/050404, dated Sep. 1, 2016, 10 pp.
(Continued)

*Primary Examiner* — Julio C. Gonzalez R.
(74) *Attorney, Agent, or Firm* — Shumaker & Sieffert, P.A.

(57) ABSTRACT

A method of operation of a turbogenerator system is described. The system comprises a plurality of turbogenerators provided in parallel and in fluid communication with a gas stream. The method comprises identifying one or more of the turbogenerators which are currently operating closest to their maximum power output, and adjusting the speed of one or more of the turbogenerators to cause the power outputs of the plurality of turbogenerators to become more similar. In this way, it is possible to match the power output of the plurality of turbogenerators.

13 Claims, 13 Drawing Sheets

Figure 1:
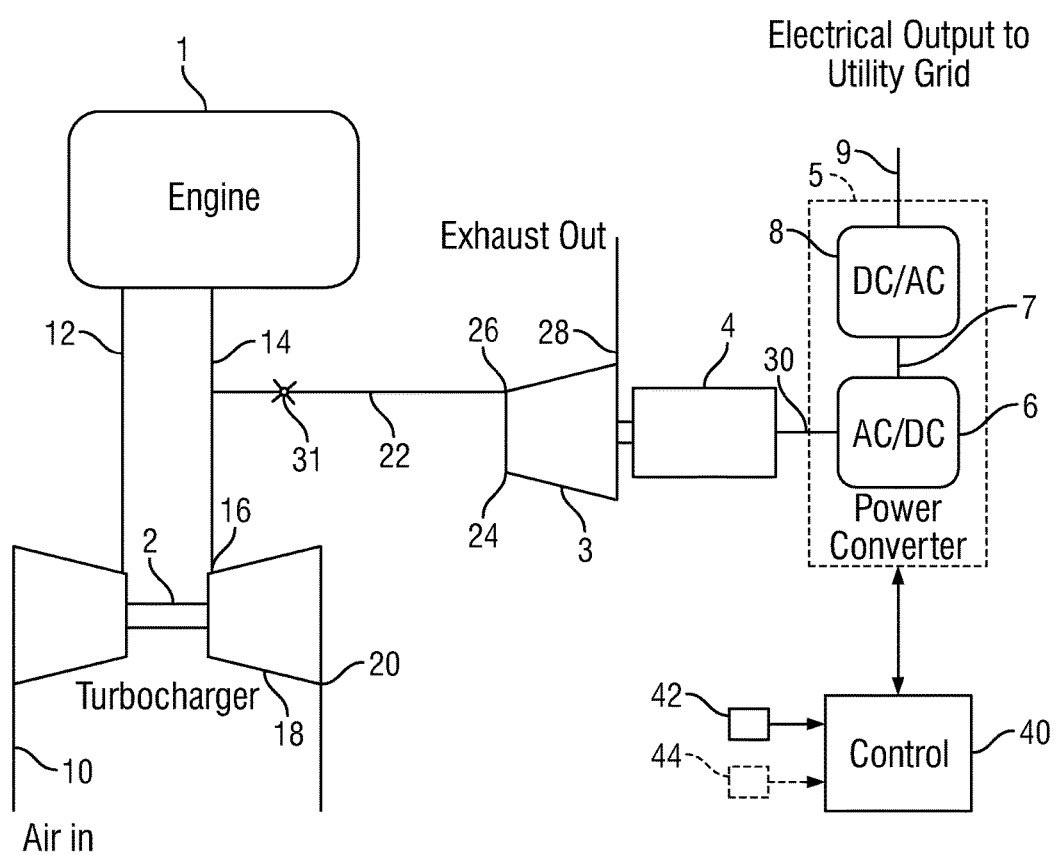

(51) Int. Cl.
  *F01D 15/10* (2006.01)
  *F02C 6/12* (2006.01)
  *F02C 9/42* (2006.01)
  *H02K 7/18* (2006.01)

(52) U.S. Cl.
  CPC ....... *H02K 7/1823* (2013.01); *F05D 2240/40* (2013.01); *F05D 2270/053* (2013.01); *F05D 2270/13* (2013.01); *F05D 2270/304* (2013.01); *F05D 2270/3061* (2013.01)

(58) Field of Classification Search
  USPC .................................................. 290/40 R, 52
  See application file for complete search history.

(56) References Cited

U.S. PATENT DOCUMENTS

| | | | | |
|---|---|---|---|---|
| 3,300,647 | A * | 1/1967 | Gogia | H02J 3/38 290/30 R |
| 6,313,544 | B1 * | 11/2001 | Mongia | F01K 21/047 290/4 R |
| 9,698,625 | B2 * | 7/2017 | Raats | H02J 9/06 |
| 9,755,458 | B2 * | 9/2017 | Frampton | H02J 3/48 |
| 2007/0035137 | A1 | 2/2007 | Matsukuma et al. | |
| 2010/0102637 | A1 * | 4/2010 | Dozier | H02J 3/46 307/84 |
| 2011/0094486 | A1 * | 4/2011 | Vuk | F01N 5/04 123/568.21 |
| 2013/0049479 | A1 * | 2/2013 | Hedquist | H02J 3/46 307/84 |
| 2014/0210256 | A1 * | 7/2014 | Raats | H02J 9/00 307/9.1 |

OTHER PUBLICATIONS

International Search Report and Written Opinion of the International Searching Authority dated Jul. 15, 2015 in corresponding International Application No. PCT/GB2015/050404, 15 pgs.
UK Search Report under Section 17(6) dated Apr. 28, 2015 in corresponding GB application No. GB1403105.8, 2 pgs.
UK Search Report under Section 17(5) dated Oct. 6, 2014 in corresponding GB application No. GB1403105.8, 4 pgs.

\* cited by examiner

TURBOGENERATOR SYSTEM

This application is a U.S. national phase application under 37 U.S.C. § 371 of international application number PCT/GB2015/050404 filed on Feb. 13, 2015, which claims the benefit of priority to GB application number 1403105.8 filed Feb. 21, 2014. The entire contents of each of international application number PCT/GB2015/050404 and GB application number 1403105.8 are incorporated herein by reference.

FIELD OF THE INVENTION

The present invention relates to turbogenerators. Embodiments of the present invention relate to a turbogenerator, a method of operating a turbogenerator, a turbogenerator system, and a method of operating a turbogenerator system.

BACKGROUND TO THE INVENTION

A turbogenerator is used to extract energy from a gas stream such as the exhaust from a compression ignition diesel engine, the exhaust from a spark ignition gas engine, steam, an organic Rankine fluid or pressurised gas. For example, exhaust energy recovered from fluid in an exhaust conduit of a reciprocating engine may be converted into electrical power for supply to a utility electrical grid network. A turbogenerator may be provided in combination with (either in parallel or series with) a turbocharger.

In GB2451703, the operation of a series turbogenerator was described in which the speed of the turbogenerator is set to optimise its efficiency. However, in some cases efficiency may not be a primary consideration, and it may instead be desirable to optimise (as far as possible) the turbogenerator to achieve maximum power output. However, achieving such an optimisation presents a challenge.

For systems in which multiple turbogenerators are provided it is even more challenging to achieve optimal (total) power output, due to variations in the pipework between the engine and the inlets to each of the turbogenerators, and due to the fact that the amount of exhaust gases fed to the parallel turbogenerators must not cause any of the turbogenerators to exceed its individual maximum power rating. As a result, the power output from the combination of multiple turbogenerators will be limited by the one that generates the most power (for a given exhaust output from the engine).

Embodiments of the present invention seek to address these problems.

SUMMARY OF THE INVENTION

According to an aspect of the present invention, there is provided a method of operation of a turbogenerator system, the system comprising a plurality of turbogenerators provided in parallel and in fluid communication with a gas stream, the method comprising the steps of:

identifying one or more of the turbogenerators which are currently operating closest to their maximum power output; and adjusting the speed of one or more of the turbogenerators to cause the power outputs of the plurality of turbogenerators to become more similar.

In this way, it is possible to match the power output of the plurality of turbogenerators. This (as will be explained in detail below) may make it possible to fully utilise the power rating of the plurality of turbogenerators. The step of adjusting the speed may comprise one or both of increasing the speed of the identified turbogenerators and decreasing the speed of at least one of those of the plurality of turbogenerators not identified as currently operating closest to their maximum power output. The step of adjusting the speed may comprise decreasing the speed of all of those of the plurality of turbogenerators not identified as currently operating closest to their maximum power output. The step of adjusting the speed may be conducted in response to a determination that the power output of an identified turbogenerator is at or near its maximum power output. The step of adjusting the speed may be conducted by increasing the speed of the identified turbogenerators if the identified turbogenerators are operating below a predetermined speed, and by decreasing the speed of at least one of those of the plurality of turbogenerators not identified as currently operating closest to their maximum power output if one or more of the identified turbogenerators are not operating below the predetermined speed. The adjustment of the turbogenerator speed may causes the power output of the identified turbogenerators to reduce.

Preferably, the method comprises a step of increasing the total flow rate of gases through the plurality of turbogenerators after the power output of the identified turbogenerators has reduced. By reducing the power output of the highest power turbogenerator first (but effectively shifting this power output to another turbogenerator which is operating below its maximum power rating), it is possible to increase the mass flow of gases to all turbogenerators without causing any of them to exceed its rating. It will be understood that the overall power generated by the plurality of turbogenerators may not remain the same immediately following the speed alteration, since power is a function of not only mass flow rate, but also of pressure ratio (across the turbogenerators) and efficiency. By modifying the speed of one or more of the turbogenerators, the inlet pressures at each of the turbogenerators (and the bypass valve—see below) will change, as may the efficiency of one or more of the turbogenerators, and thus, the system as a whole. However, the principle still remains that by modifying the speed of one or more turbogenerators it is possible to reduce the power output of one or more of the turbogenerators and increase the power output of the remainder of the turbogenerators, thereby achieving power balancing. The step of increasing the total flow rate of gases through the plurality of turbogenerators may continue until either all of the turbogenerators have a power output closest to their maximum power output, or until the total flow rate reaches a maximum level. Preferably, the increase in the total flow rate of the gases is controlled by a valve. Preferably, the valve is a bypass valve disposed in parallel with the plurality of turbogenerators, and the increase in the total flow rate of the gases is achieved by closing the bypass valve to reduce the flow of gases through the bypass valve and thereby increase the flow of gases through the plurality of turbogenerators. Each of the plurality of turbogenerators may have the same maximum power output. In this case, the step of identifying one or more of the turbogenerators which are currently operating closest to their maximum power output comprises identifying one or more of the turbogenerators which currently have the highest power output. The step of adjusting the speed of a turbogenerator may comprise adjusting a load on the turbogenerator. The turbogenerator system may be an electric turbocompounding system comprising a turbocharger arranged in fluid communication with the engine, and the plurality of turbogenerators may be arranged either in series with or in parallel to the turbocharger.

Preferably, the gas stream is a stream of exhaust gases from an engine. However, it will be appreciated that embodiments of the present invention could be applied to gas streams not originating from an engine.

According to another aspect of the present invention, there is provided a turbogenerator system, comprising:

a plurality of turbogenerators provided in parallel and in fluid communication with a gas stream;

a controller operable to identify one or more of the turbogenerators which are currently operating closest to their maximum power output, and operable to adjust the speed of one or more of the turbogenerators to reduce the power output of the identified turbogenerators.

According to another aspect of the present invention, there is provided a method of operation of a turbogenerator in fluid communication with a gas stream, comprising the steps of:

determining a mass flow rate of gases through the turbogenerator;

determining a speed for the turbogenerator at which the power output of the turbogenerator would be substantially maximised using the determined mass flow rate and a first predetermined relationship between turbine speed for maximum power output and mass flow rate; and adjusting the speed of the turbogenerator based on the determined speed.

In this way, it is possible to operate a control loop to substantially maximise the power output of the turbogenerator, even when the mass flow rate of gases changes (for example because an engine generates fewer exhaust gases, or a turbocharger also attached to the engine requires more of those exhaust gases).

Preferably, the method further comprises a step of determining an expansion ratio between the inlet and the outlet of the turbogenerator. In this case, the step of determining the mass flow rate comprises calculating the mass flow rate using the determined expansion ratio, a current speed of the turbogenerator and a second predetermined relationship between mass flow rate, speed and expansion ratio. The step of determining the expansion ratio may comprise measuring an inlet pressure of the turbogenerator, and calculating the expansion ratio based on the measured inlet pressure and an outlet pressure of the turbogenerator. The outlet pressure may be measured or estimated.

The step of determining the mass flow may comprise calculating a reduced mass flow rate from the determined expansion ratio, the current speed of the turbogenerator and the second predetermined relationship between mass flow rate, speed and expansion ratio, and then converting the calculated reduced mass flow rate into the mass flow rate based on a measured inlet pressure of the turbogenerator and a measured or estimate inlet temperature of the turbogenerator. The first predetermined relationship may be represented by a look up table which is used to obtain the speed for maximum power output from the determined mass flow rate. The step of calculating the reduced mass flow rate may comprise calculating a current reduced speed of the turbogenerator based on its speed of rotation a measured or estimated inlet temperature of the turbogenerator, and calculating the reduced mass flow rate based on the calculated reduced speed.

The step of determining a speed for the turbogenerator at which the power output of the turbogenerator would be substantially maximised comprises determining a reduced speed from the determined mass flow rate and the first predetermined relationship and converting the determined reduced speed to a speed of rotation based on the measured or estimated inlet temperature of the turbogenerator. The first predetermined relationship may be derived from one or more turbine characteristics of the turbogenerator. Alternatively, the first predetermined relationship may be based on performance test data for the turbogenerator.

The step of adjusting the speed of the turbogenerator may comprise adjusting a load on the turbogenerator. The turbogenerator may be part of an electric turbocompounding system comprising a turbocharger arranged in fluid communication with the reciprocating engine, wherein the turbogenerator is arranged in parallel with the turbocharger.

Preferably, the gas stream is a stream of exhaust gases from an engine. However, it will be appreciated that embodiments of the present invention could be applied to gas streams not originating from an engine.

According to another aspect of the present invention, there is provided a turbogenerator, arranged in use to receive a gas stream, the turbogenerator comprising:

a turbine, through which the gas passes to cause rotation of the turbine;

a power converter, for generating electrical power from the rotation of the turbine; and a controller, the controller being operable to determine a mass flow rate of gases through the turbine;

determine a speed of turbine rotation at which the power output of the turbogenerator would be substantially maximised using the determined mass flow rate and a first predetermined relationship between turbine speed for maximum power output and mass flow rate; and adjust the speed of turbine rotation based on the determined speed.

DETAILED DESCRIPTION

Figure 2:
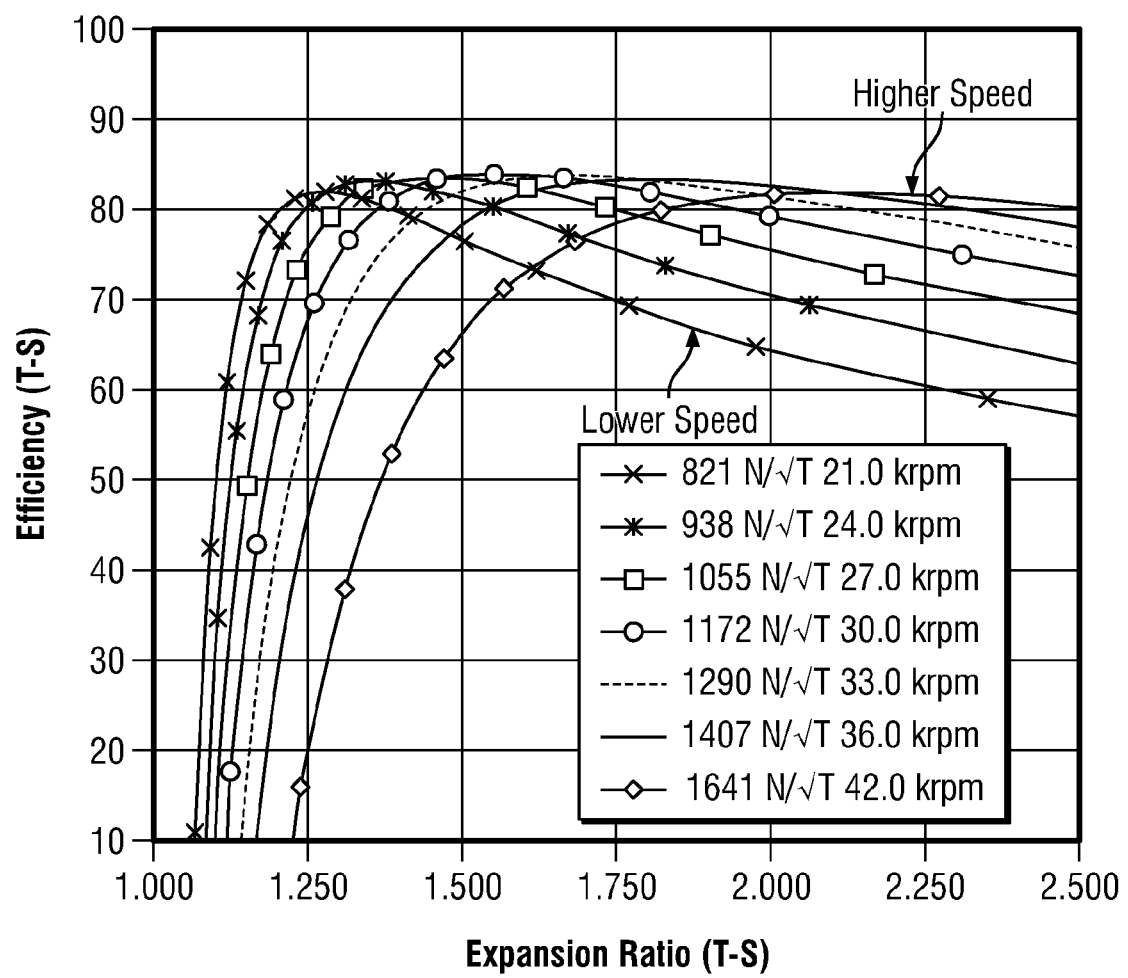
Figure 3:
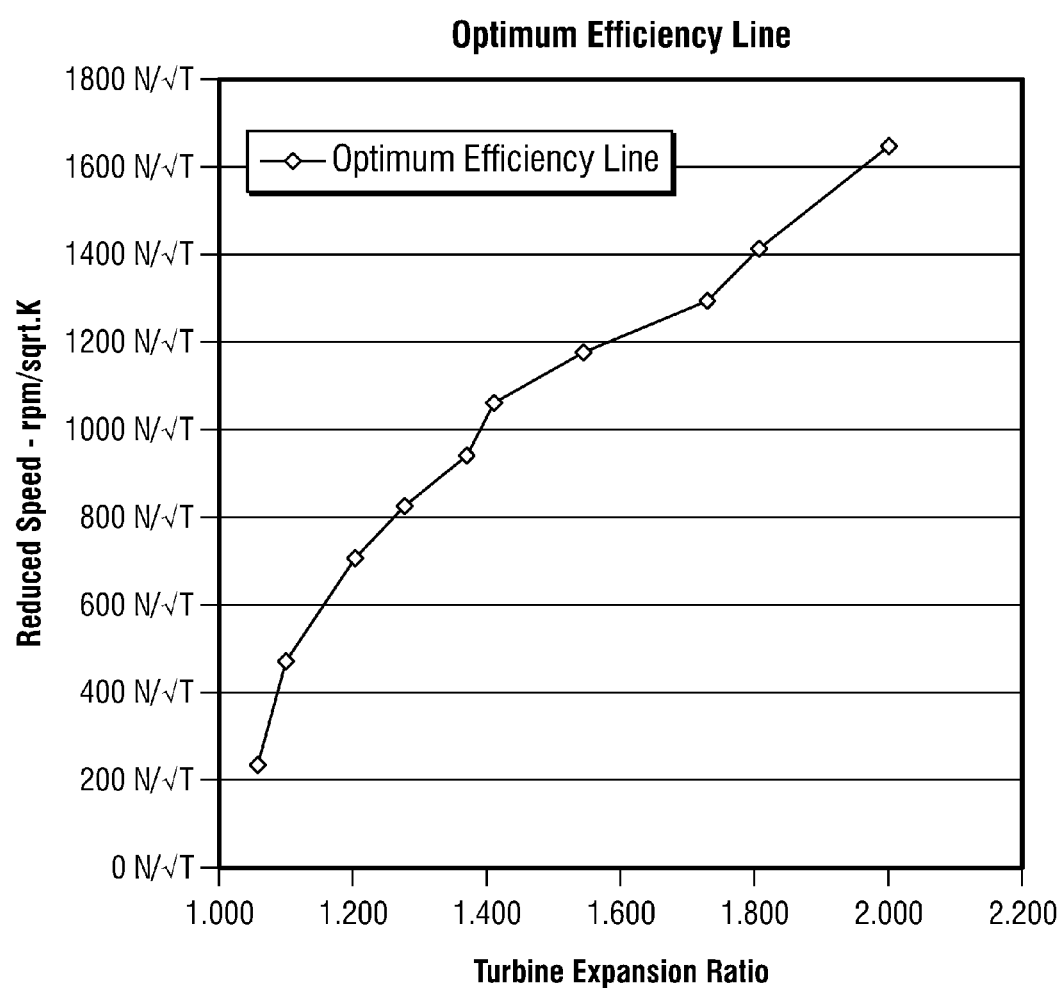
Figure 4:
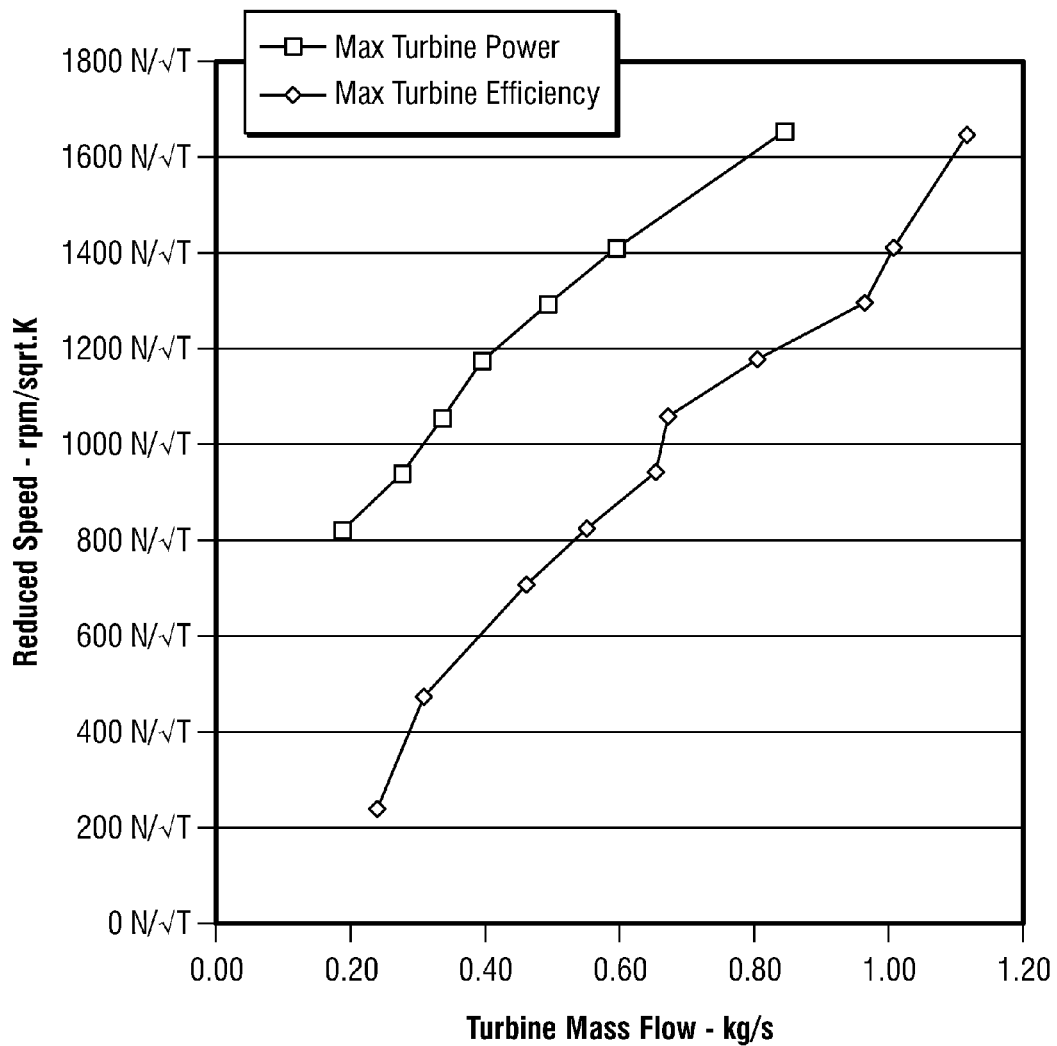
Figure 5:
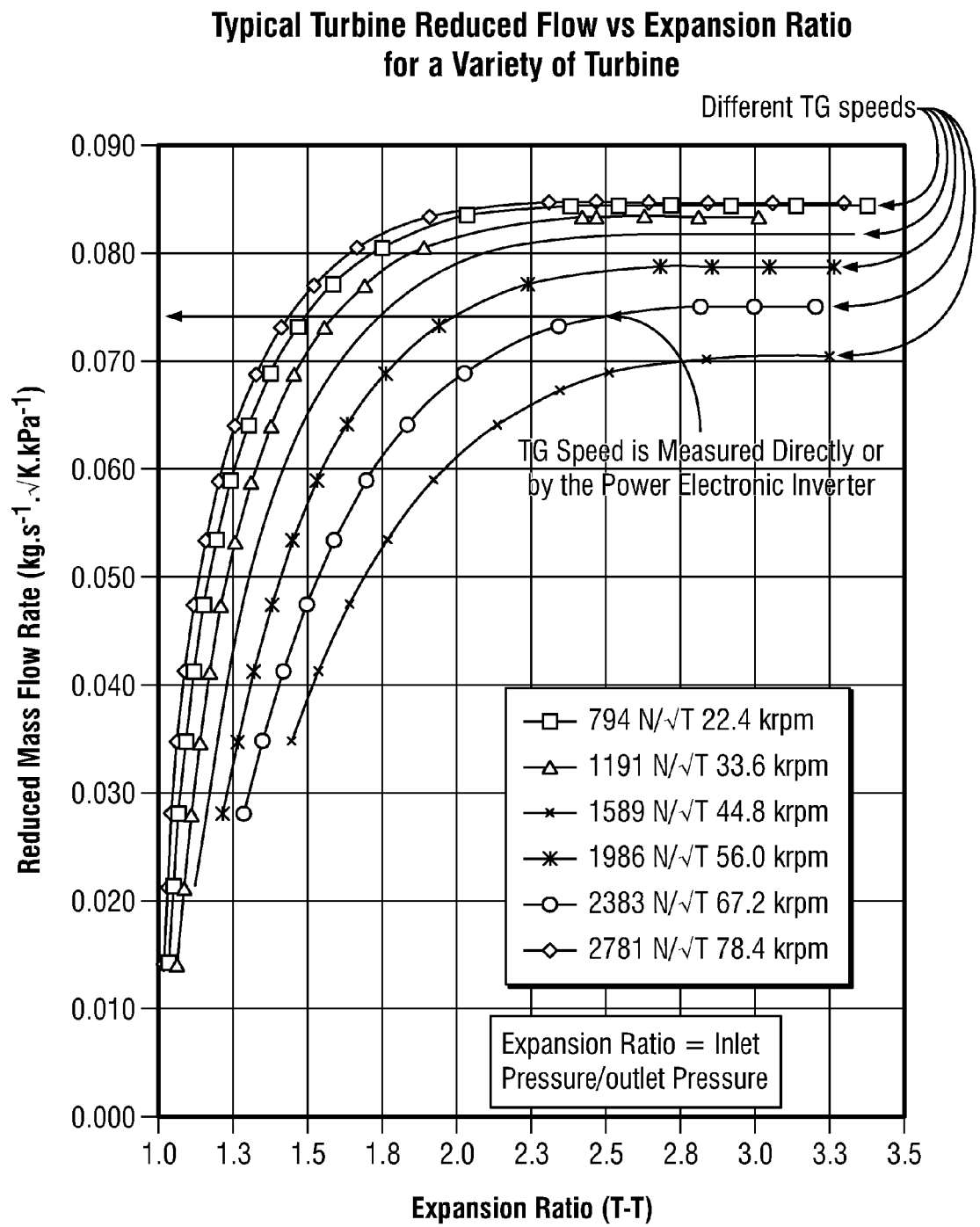
Figure 6:
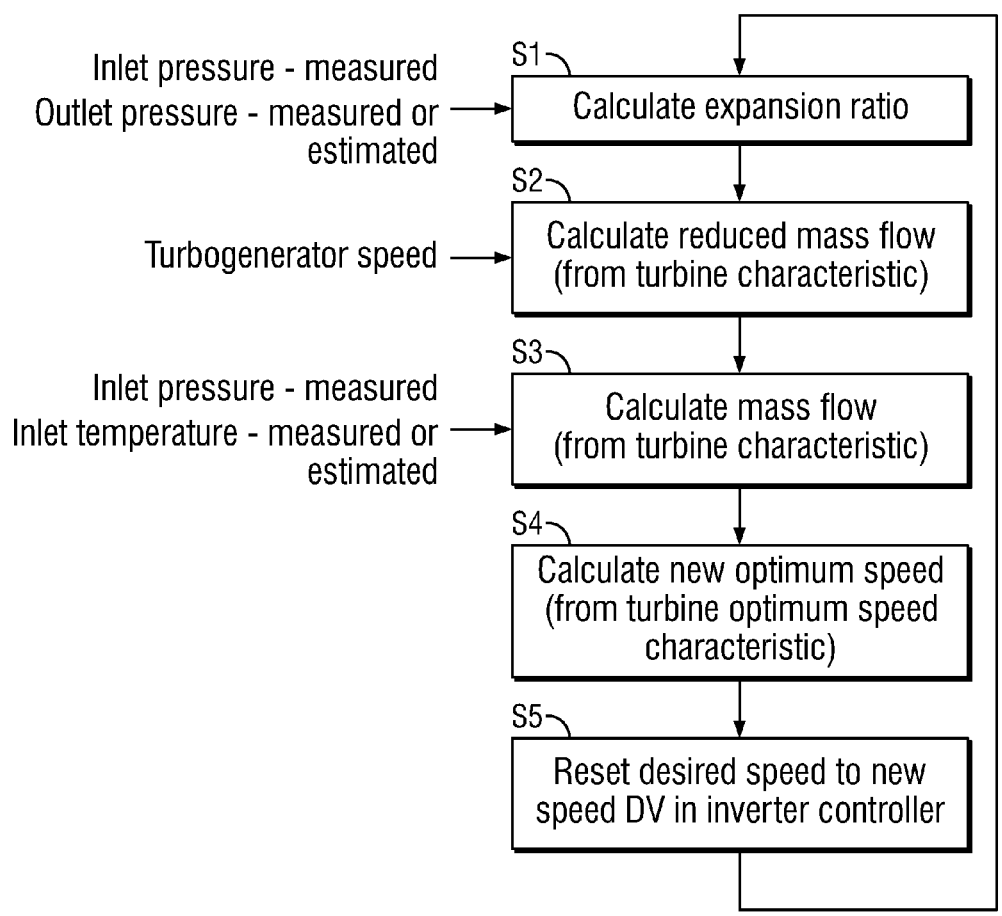
Figure 7:
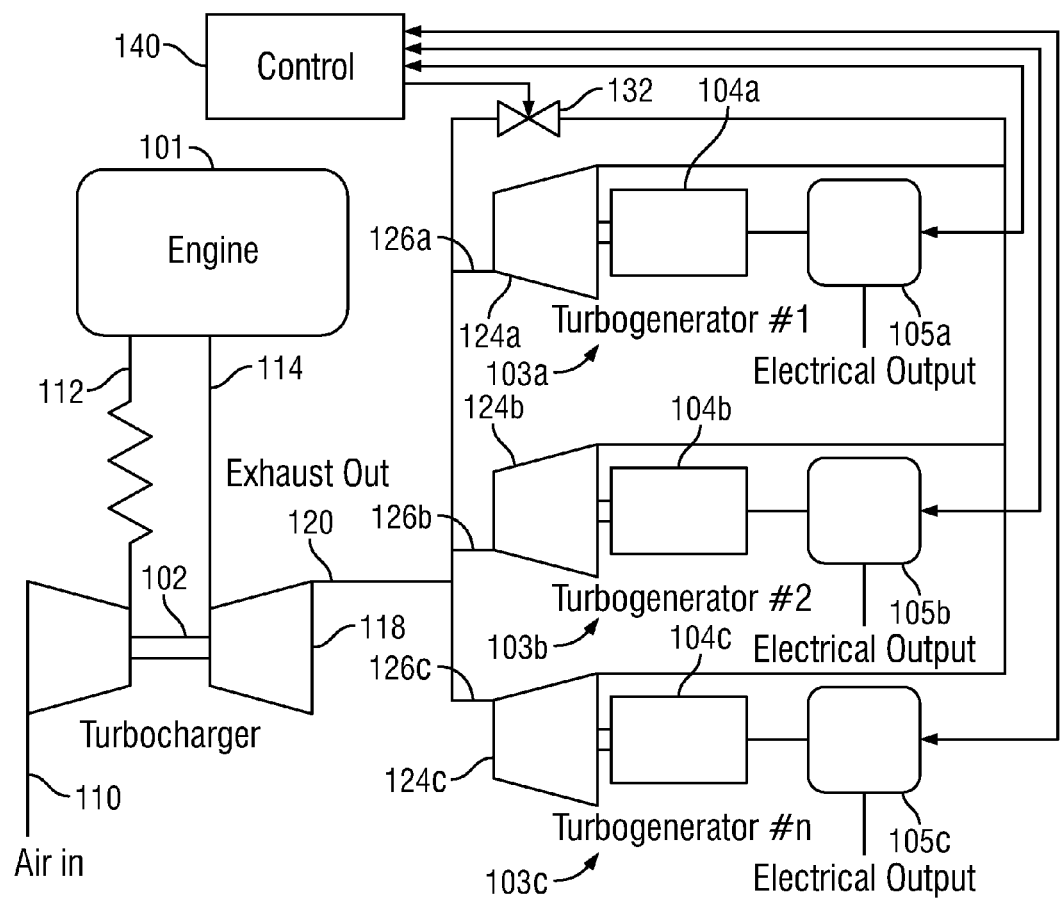
Figure 8:
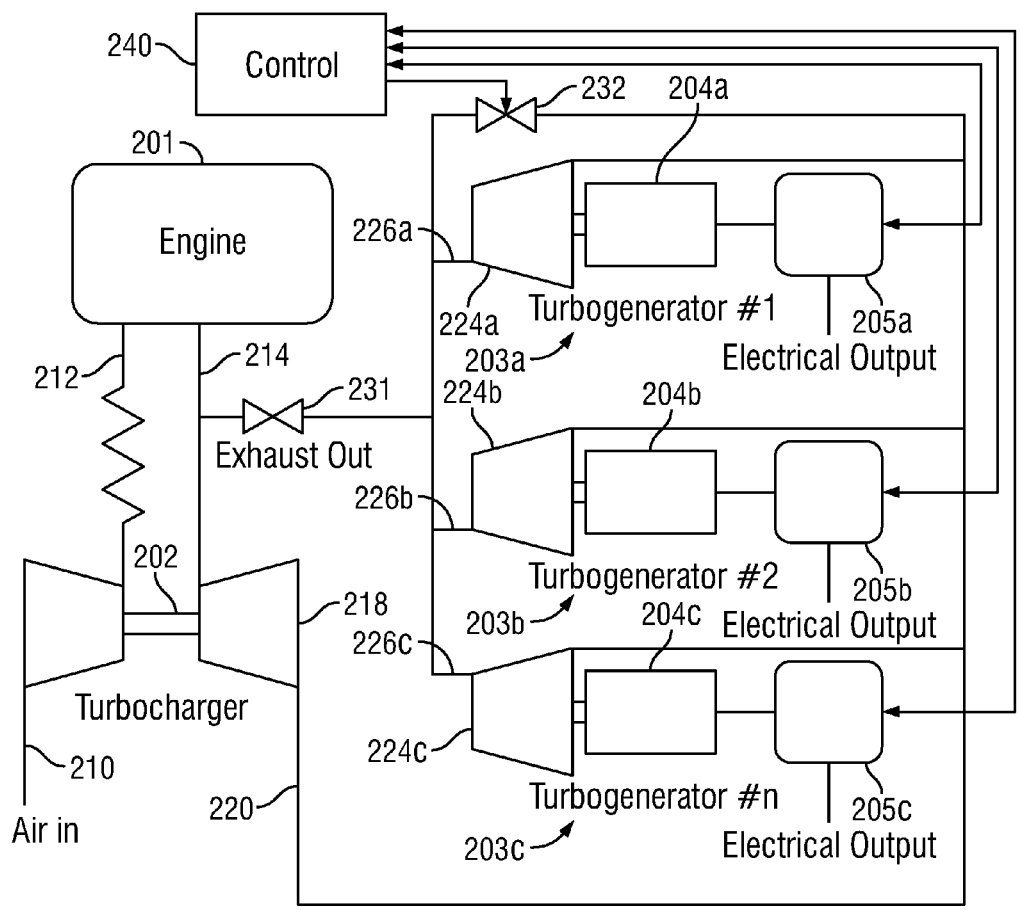
Figure 9:
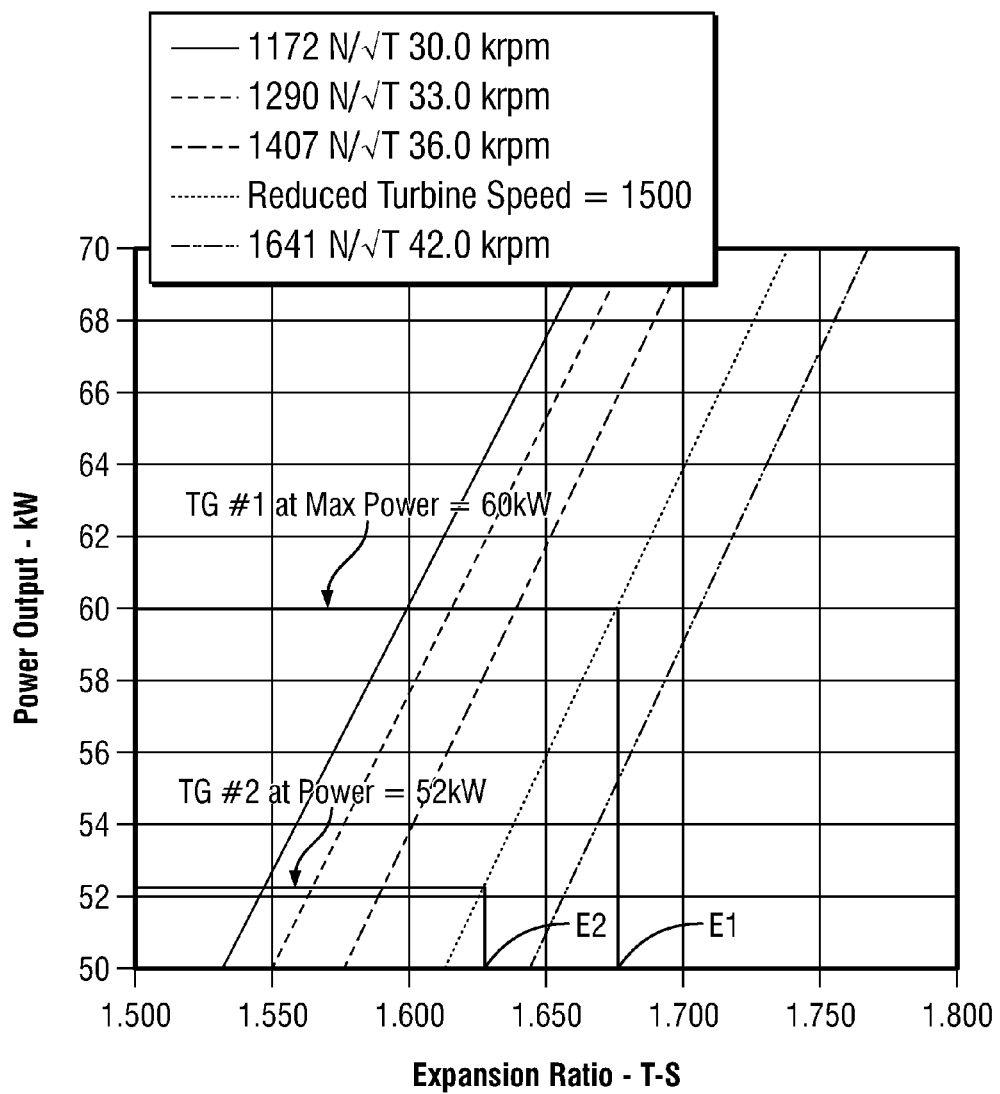
Figure 10:
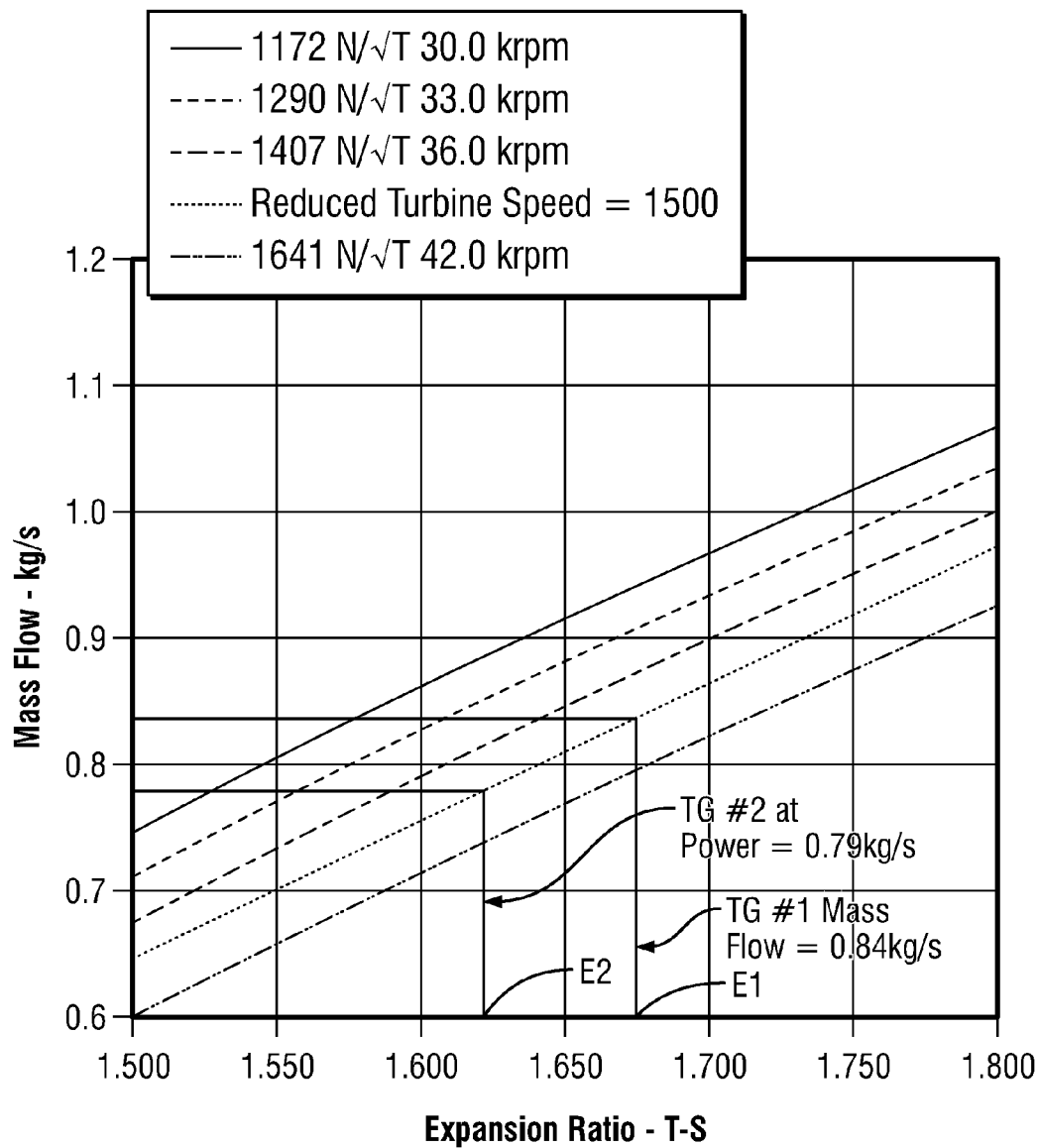
Figure 11:
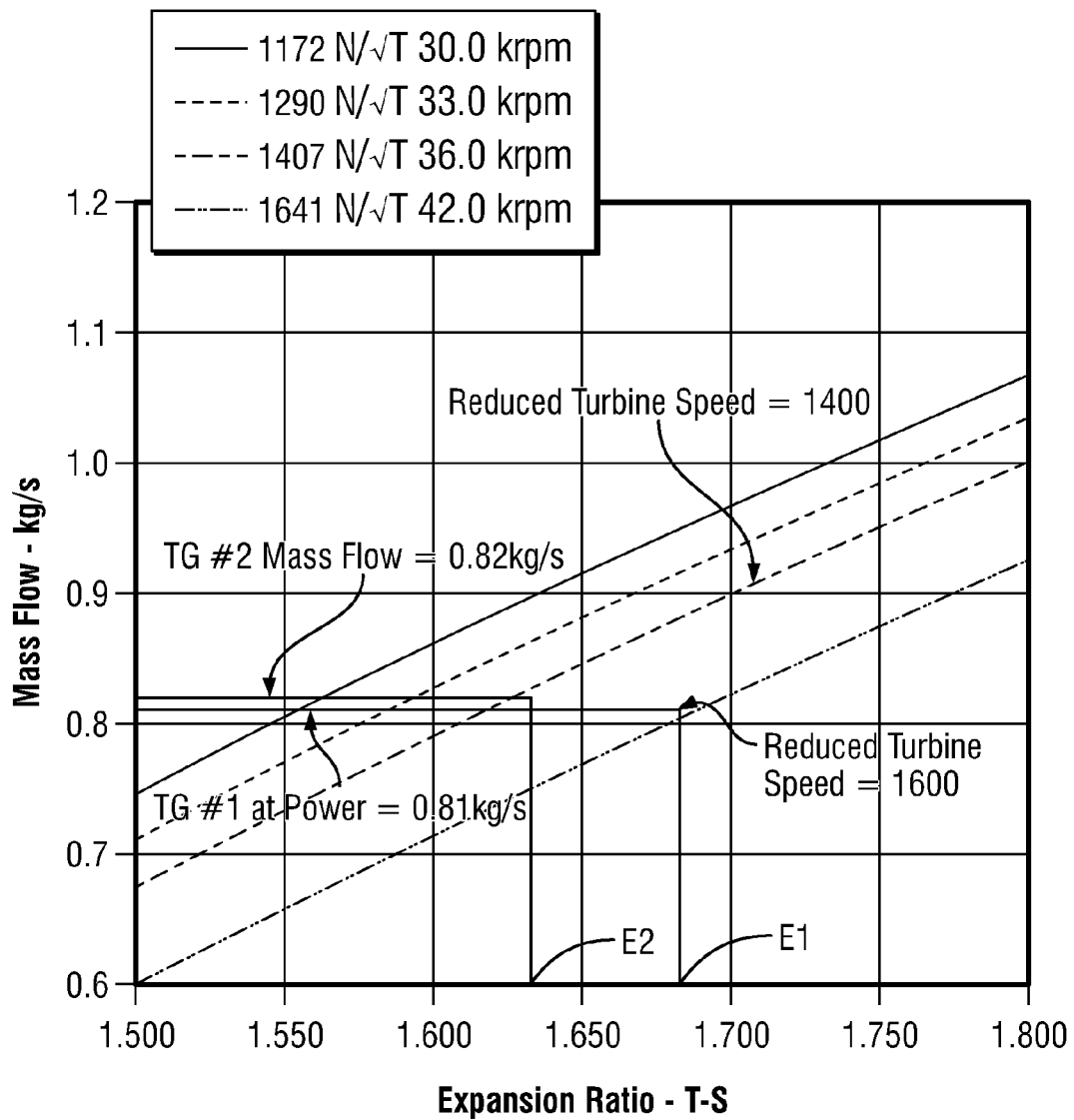
Figure 12:
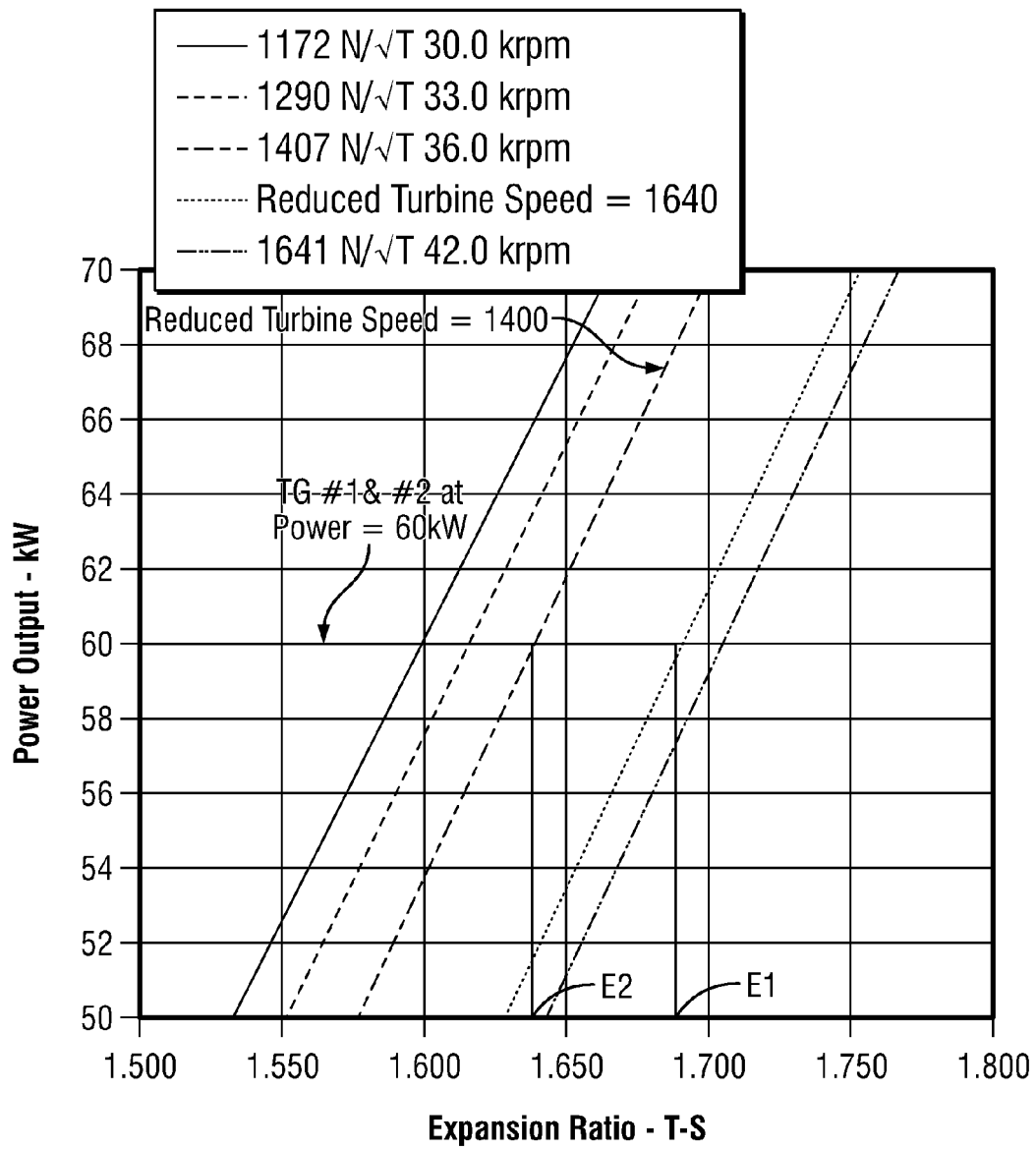
Figure 13:
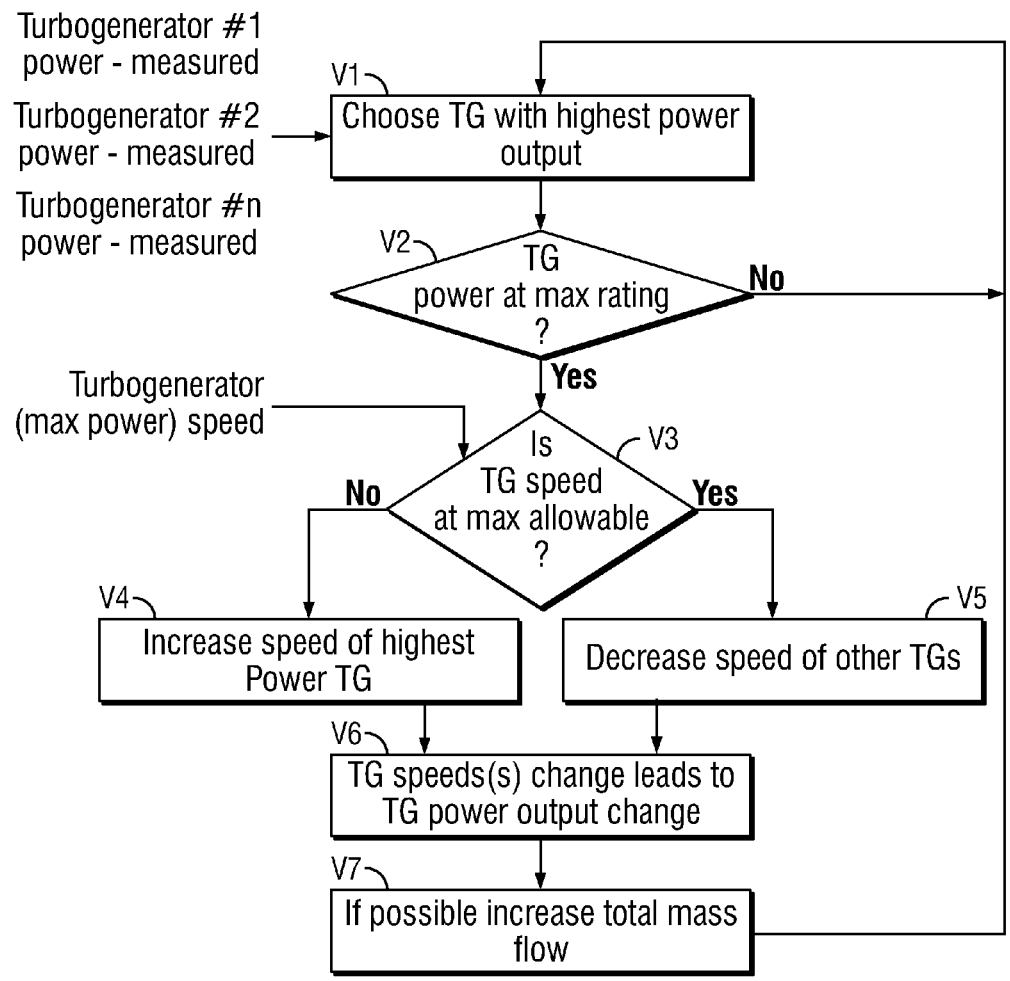

The invention will now be described by way of example with reference to the following Figures in which:

FIG. 1 schematically illustrates an engine and energy recovery system according to a first embodiment;

FIG. 2 schematically illustrates a relationship between expansion ratio, turbine wheel speed and turbine stage efficiency for a typical turbine stage;

FIG. 3 schematically illustrates a relationship between expansion ratio and optimum turbine wheel speed to achieve optimum turbine efficiency;

FIG. 4 schematically illustrates a relationship between mass flow and optimum turbine wheel speed to achieve either optimum turbine efficiency or maximum power output;

FIG. 5 schematically illustrates a relationship between reduced mass flow rate, expansion ratio and turbine speed for a typical turbine;

FIG. 6 is a schematic flow diagram describing a control loop for substantially maximising the power output of the energy recovery system described in FIG. 1;

FIG. 7 schematically illustrates an engine and energy recovery system utilising multiple turbogenerators (in series with a turbocharger) according to a second embodiment;

FIG. 8 schematically illustrates an engine and energy recovery system utilising multiple turbogenerators (in parallel with a turbocharger) according to the second embodiment;

FIG. 9 schematically illustrates the power output of two parallel turbogenerators on a graph describing a relationship between power output and expansion ratio for a variety of different turbine speeds;

FIG. 10 schematically illustrates the mass flow through the two parallel turbogenerators at the power output levels described in FIG. 9;

FIG. 11 schematically illustrates a variant of FIG. 10 in which the speed of one of the turbogenerators has been reduced and the speed of the other increased;

FIG. 12 schematically illustrates the power output of the two parallel turbogenerators in the speed configuration of FIG. 11; and FIG. 13 is a schematic flow diagram describing a control loop for substantially maximising the power output of the energy recovery systems of FIGS. 7 and 8.

FIRST EMBODIMENT—CONTROLLING SINGLE TURBOGENERATOR SPEED TO MAXIMISE POWER OUTPUT

Referring first to FIG. 1, this shows a system comprising a turbocharged engine, a turbogenerator and associated power converter (PC) used to convert the power generated from the turbogenerator into a form that can be injected into the utility electrical grid network. The first embodiment is particularly applicable to a turbogenerator in a parallel configuration with a turbocharger. In FIG. 1, a turbocharged engine 1 is provided, which has an exhaust outlet 14 which leads, via an exhaust conduit 22 and a valve 31, to an inlet 26 of a turbogenerator 3. An associated power converter 5 is provided to convert power generated by the turbogenerator 3 into a form that can be injected into the utility electrical grid network (electrical output to utility grid).

The reciprocating engine 1 may be a diesel or spark ignition reciprocating engine, arranged to receive incoming air via an air supply line 10 from a turbocharger 2 by way of an air inlet conduit 12. The exhaust conduit 14 exhausts into an inlet 16 of a turbine 18 of the turbocharger 2 in addition to leading to the turbogenerator 3. The valve 31 controls the proportion of exhaust gases being provided to the turbocharger 2 versus the turbogenerator 3. An outlet 20 of the turbine 18 exhausts to atmosphere.

The turbogenerator 3 comprises a turbine 24, having the inlet 26 for receiving fluid from the exhaust conduit 22 and an outlet 28 for exhausting fluid to atmosphere. The turbogenerator 3 also comprises an alternator 4 arranged on an output shaft of the turbine 24 for the conversion of shaft power into electrical power, and the alternator 4 is connected by way of an electrical connection 30 to a power converter 5, which supplies an electrical output, as shown, to a utility electrical grid network. The power converter 5 includes an AC/DC converter 6 for converting the AC output from the alternator 4 to a DC supply on a DC link line 7, and a DC/AC inverter 8 for generating a three-phase output for supply to the utility grid via an output line 9.

The operation of the turbogenerator is controlled by a controller 40, which is connected to the power converter 5. The power converter 5 is able to provide the controller 40 with an indication of the current speed of rotation of the turbine 24. In an alternative embodiment the speed of rotation of the turbine 24 is measured directly by a sensor at the turbine 24. The controller 40 measures an inlet pressure at the inlet 26 using a sensor 42, which may be provided in the form of a pressure transducer comprising a diaphragm with a strain gauge bonded to it. Further sensors 44 may be provided which measure the pressure at the outlet 28, the temperature at the inlet 26, and the temperature at the outlet 28. The controller 40 is able to slow down or speed up the rotational speed of the turbine 24 by causing the power converter 5 to adjust the electrical load on the alternator 4. In order to slow down the turbine 24, the electrical load is increased, and in order to speed up the turbine 24 the electrical load is reduced. The controller 40 is therefore able to control the speed of rotation of the turbine 24 for the purposes which will be described in detail below.

Previous turbogenerator control techniques have focused on maximising the efficiency of the turbine stage. By way of illustration, referring to FIG. 2, a typical turbine stage has a characteristic that links the expansion ratio across the turbine, the turbine wheel rotational speed and the turbine stage efficiency. In FIG. 2, the horizontal axis indicates the expansion ratio across the turbogenerator 3 (that is, the ratio of the inlet pressure at 26 to the outlet pressure at 28 in FIG. 1). The vertical axis indicates the efficiency of the turbine (as a percentage). Each of the lines plotted on FIG. 2 represents the relationship between expansion ratio and efficiency for a particular turbogenerator speed. In the present case, the relationship is plotted for 7 different speeds, ranging from 821 N/√T (21.0 krpm) to 1641 N/√T (42.0 krpm). It will be noted that FIG. 2 is plotted for "reduced speed" rather than the absolute speed of rotation of the turbine rotor. The relationship between actual speed and reduced speed is as set out in Equation (1) below:

$$\text{Reduced speed} = \text{rotor speed (revolutions per minute)}/\sqrt{\text{Temperature }(K)} \quad \text{Eq (1)}$$

As can be seen from FIG. 2, at low expansion ratios a lower speed is more efficient, while at higher expansion ratios a higher speed is more efficient. It will therefore be understood that the most efficient speed of operation of a turbogenerator varies as a function of expansion ratio. This leads to the relationship between expansion ratio and optimum turbine wheel speed to get the best turbine efficiency which is illustrated in FIG. 3. Referring to FIG. 3, an optimum efficiency line is shown on a graph of turbine expansion ratio (horizontal axis) against reduced speed (vertical axis). It can be seen here that optimum speed generally increases as turbine expansion ratio increases. In this way, it is possible to maximise the efficiency of a turbogenerator by varying its speed to match an optimal speed for a current expansion ratio. It will be appreciated that the expansion ratio may vary as a function of the exhaust output from the engine, and as a function of how open the valve 31 is at any given time. Maintaining maximum efficiency therefore requires a continuous control loop which continually revises the rotor speed (noting that the reduced speed plotted on FIG. 3 would need to be converted into an actual rotor speed using Equation (1) above) as the expansion ratio varies in order to stay as close as possible to the optimum efficiency line shown in FIG. 3.

While efficiency is often a primary driver, in some cases it is more important to maximise power output. As will become clear, the first embodiment involves controlling the speed of the turbogenerator to optimise its power output instead of its efficiency. This is achieved by first measuring the turbogenerator speed and pressure upstream of the turbogenerator, and either measuring downstream pressure and upstream temperature or by making assumptions about the likely values for these parameters. Then, the mass flow of the exhaust gases passing through the turbogenerator is calculated based on these parameters. A look up table is then used to select a set point for the turbogenerator speed. The turbogenerator speed is therefore varied iteratively to give optimum performance in terms of maximising (as far as practicable) power output. In this way, it is possible to optimise the power output of a turbogenerator by changing its speed.

For any given turbine mass flow, the power generated by a turbogenerator is linked not only to the stage efficiency, but also to the expansion ratio across the turbogenerator. In most cases, the rotor speed required to generate maximum power is substantially higher than the rotor speed required to achieve optimum stage efficiency. This is shown graphically in FIG. 4, in which the horizontal axis represents turbine mass flow (in kg/s), and the vertical axis represents reduced speed. The lower line plotted on the graph of FIG. 4 represents the reduced speed required in order to achieve optimum turbine efficiency. The upper line plotted on the graph of FIG. 4 represents the reduced speed required in order to achieve maximum turbine power.

The reduced speed required to achieve maximum turbine power may be calculated from turbine characteristics, or may be determined experimentally. The power produced by a turbine can be expressed as follows:

$$Q = m \times Cp \times (T1-T2) \qquad \text{Eq (2)}$$

Where Q=Power generated by the turbine, m=mass flow rate through turbine, T1=Turbine inlet temperature (K), T2=Turbine discharge temperature (K), and Cp is the specific heat capacity of the gas in kJ/kg·K. The power, Q, needs to be optimised for its maxima (maximum power, not maximum stage efficiency) for any given turbine mass flow for a series of mass flow rates in order to arrive at the maximum power line of FIG. 4.

It will be understood that, in order to determine the actual rotor speed from the reduced speed specified in FIG. 4, it would be necessary to perform a conversion from reduced speed using Equation (1) above. In the case of 0.8 kg/s of mass flow being available, in order to extract maximum power, rather than running the turbine at a reduced speed of ~1200 rpm/√T (which would achieve optimum efficiency), the turbine should be run at 1600 rpm/√T. In order to be able to select the optimal turbine speed for maximum power (based on FIG. 4), the turbine mass flow rate is required. However, this parameter is both difficult and costly to measure directly. Instead, the mass flow can be calculated from a knowledge of the following parameters:

Turbine inlet pressure (P1)—measured, in kPa (absolute)

Turbine speed—measured, in rpm (conversion to reduced speed required)

Turbine inlet temperature—measured or estimated, in Kelvin (K)

Turbine discharge pressure (P2)—measured or estimated, in kPa (absolute)

First, the expansion ratio across the turbogenerator is calculated according to the following:

$$\text{Expansion ratio} = \frac{P1}{P2} = \left[\frac{T1}{T2}\right]^{\frac{\gamma}{\gamma-1}} \qquad \text{Eq (3)}$$

Where: T1=Turbine inlet temperature (K), T2=Turbine discharge temperature (K), γ=ratio of heat capacities Cp and Cv, where Cp is the specific heat capacity of the gas in kJ/kg·K.

The inlet pressure (P1) is detected by the sensor 42. The outlet pressure (P2) might be detected by a sensor 44, or alternatively it could be estimated based on known (application specific) operating and/or environmental conditions for the turbogenerator 3. For example, the outlet pressure might be based on atmospheric pressure, and the inlet temperature may be based on the exhaust manifold temperature at full load.

FIG. 5 is a graph relating the expansion ratio of the turbogenerator (horizontal axis) to the reduced mass flow rate. In particular, FIG. 5 plots reduced flow rate versus expansion ratio for a variety of different turbine reduced speeds. The reduced mass flow rate is measured in units of kg·s⁻¹·√K·Pa⁻¹. The relationship between mass flow rate and reduced mass flow rate is as follows:

Reduced mass flow rate=mass flow rate×√Inlet temperature/Inlet Pressure  Eq (4)

From the expansion ratio and the current turbine speed, it is possible to derive from FIG. 5 a current reduced mass flow rate through the turbogenerator. For example, if the expansion ratio is determined to be 2.5, and the current reduced speed (converted from the rotor speed using Equation (1) above) is 2383 N/√T (or 67.2 krpm), then the reduced mass flow rate can be seen to be approximately 0.074 kg·s⁻¹·√K·Pa⁻¹. It will be appreciated that, in practice, the determination of reduced mass flow rate from expansion ratio and reduced speed could be made using an algorithm at the controller 40, or using a lookup table (LUT) at the controller 40. It will be appreciated that FIG. 5 relates reduced mass flow rate, turbine speed and expansion ratio for a typical turbine. However, the specific relationship will depend on the characteristics of the turbine/turbogenerator. The specific relationship used in the algorithm (or represented by the lookup table) could be derived computationally, based on the turbine characteristics, or experimentally.

From the reduced mass flow rate the mass flow rate can be calculated using Equation (4) above, which will require the measured inlet pressure (P1) as well as either the measured inlet temperature (T1) or an estimate of the inlet temperature (T1). Once the mass flow rate has been determined, this and the current reduced speed can be fed into the graph (or algorithm or lookup table) of FIG. 4 in order to obtain a turbine speed which can be expected to provide maximum power output from the turbogenerator.

Referring now to FIG. 6, a control loop utilising the principles described above is provided. At a step S1, the expansion ratio is calculated based on the measured inlet pressure and the outlet pressure (measured or estimated). Then, at a step S2, the reduced mass flow rate is calculated from the current turbogenerator speed, the expansion ratio, and turbine characteristics (see FIG. 5). At a step S3, the reduced mass flow rate is converted into the mass flow rate based on equation (4) above, using the measured inlet pressure and the inlet temperature (measured or estimated). At a step S4, a new optimum speed is calculated from the calculated mass flow rate and turbine optimum speed characteristics (see FIG. 4). The optimum speed is then used to adjust a set speed for the turbine rotor. The process then returns to the step S1. It will be appreciated that the steps S1 to S5 form a control loop, which will run continuously. It should be understood that, by changing the speed at the step S5, the inlet pressure may change, which will result in a new expansion ratio at the next iteration of the step S1, which will filter through the steps S2 to S5 to result in a new, different, set speed. This process would continue until the control loop stabilises. It should also be appreciated that the inlet pressure will also vary as a function of the amount of exhaust gases output from the engine 1, and passed to the turbogenerator via the valve 31. In the case of a change in the inlet pressure due to such a change in the flow of gases to the turbogenerator, the control loop will determine a new expansion ratio, mass flow and target speed in order to maintain or regain maximum power input for any given operating conditions. The same principle will apply for other changes. For example, the inlet and/or outlet temperatures may change over time (e.g. day/night operation, or as the turbogenerator warms up from a cold start), which would result in the control loop re-evaluating the optimimum rotor speed for maximum power output.

SECOND EMBODIMENT—CONTROLLING PLURAL TURBOGENERATORS TO MAXIMISE OVERALL POWER OUTPUT

In some cases, a single engine may be fitted with an energy recovery system which comprises more than one turbogenerator. Referring to FIG. 7, a system comprising a turbocharged engine and a set of plural turbogenerators provided in parallel is shown. The system of FIG. 7 provides a turbogenerator array in series with a turbocharger. In particular, in FIG. 7, a turbocharged engine 101 is provided, which has an exhaust outlet 114 which leads into an inlet of a turbine 118 of a turbocharger 102. The reciprocating engine 1 may be a diesel or spark ignition reciprocating engine, arranged to receive incoming air via an air supply line 110 through the turbocharger 102 by way of an air inlet conduit 112. An outlet 120 of the turbine 118 exhausts to inlets 126a, 126b, 126c of respective turbogenerators 103a, 103b, 103c, thereby providing a series arrangement of engine 101, turbocharger 102 and turbogenerators 103a, 103b, 103c. The outlet 120 of the turbine 118 also exhaust to a bypass value 132 which is provided in parallel with the turbogenerators 103a, 103b, 103c. By opening the bypass valve 132, the inlet pressure at the inlets 126a, 126b, 126c is reduced and more of the exhaust gases from the turbocharger 102 can be diverted away from the inlets 126a, 126b, 126c to reduce the pressure ratio and reduce the mass flow rate of gases through all of the generators 103a, 103b, 103c. Similarly, by closing the bypass valve 132, the inlet pressure at the inlets 126a, 126b, 126c is increased and more of the exhaust gases from the turbocharger 102 enter the inlets 126a, 126b, 126c to increase the pressure ratio and increase the mass flow rate of gases through all of the generators 103a, 103b, 103c. It will be appreciated that the bypass valve 132 is not able to individually control the mass flow rate and inlet pressures of specific turbogenerators. Each of the turbogenerators 103a, 103b, 103c is provided with an associated power converter 105a, 105b, 105c which is able to convert power generated by the turbogenerators 103a, 103b, 103c into a form that can be injected into the utility electrical grid network. The turbogenerators 103a, 103b, 103c each comprise a turbine 124a, 124b, 124c, having the inlet 126a, 126b, 126c for receiving fluid from the exhaust conduit 120 and an outlet for exhausting fluid to atmosphere (it will be noted that in FIG. 7 all of the outlets are joined together, and to the outlet of the valve 132). Each turbogenerator 103a, 103b, 103c also comprises an alternator 104a, 104b, 104c arranged on an output shaft of its respective turbine 124a, 124b, 124c for the conversion of shaft power into electrical power, and each alternator 104a, 104b, 104c is connected by way of an electrical connection a respective power converter 105a, 105b, 105c, which supplies an electrical output, as shown, to a utility electrical grid network. The power converters 105a, 105b, 105c may be of the same type and function as the power convertor 5 of FIG. 1.

The operation of the array of turbogenerators 103a, 103b, 103c is controlled by a controller 140, which is connected to each of the power converters 105a, 105b, 105c, and to the valve 132. Each power converter 105a, 105b, 105c is able to provide the controller 140 with an indication of the current speed of rotation of its respective turbine 124a, 124b, 124c, although in an alternative embodiment the speed of rotation is instead measured directly by sensors at the turbines 124a, 124b, 124c. The controller 140 is able to slow down or speed up the rotational speed of each turbine 124a, 124b, 124c by causing one (or more) power converter 105a, 105b, 105c to adjust the electrical load on its respective alternator 104a, 104b, 104c. As with FIG. 1, in order to slow down a turbine, the electrical load is increased, and in order to speed up the turbine the electrical load is reduced. The controller 140 is therefore able to control the speed of rotation of the turbines for the purposes which will be described in detail below. It should be understood that the controller 140 is able to control the speed of each turbine independently from the others. The controller 140 is also able to control the bypass valve 132 to increase or decrease the inlet pressures and the amount of exhaust gases passing through the array of turbogenerators, thereby changing the pressure ratio and the total mass flow rate.

Referring now to FIG. 8, a system similar to that of FIG. 7 is shown, but in the case of FIG. 8 the turbogenerator array is provided in parallel with the turbocharger rather than series. In FIG. 8, a turbocharged engine 201 is provided, which has an exhaust outlet 214 which leads into an inlet of a turbine 218 of a turbocharger 202. The reciprocating engine 1 is arranged to receive incoming air via an air supply line 210 through the turbocharger 202 by way of an air inlet conduit 212. An outlet 220 of the turbine 218 exhausts to the atmosphere, in contrast to the FIG. 7 example in which the turbine 118 exhausts to the turbogenerator array. Instead, in FIG. 8, exhaust gases from the engine 201 are provided directly to turbogenerators 203a, 203b, 203c via a valve 231, thereby providing a parallel arrangement of engine 201, turbocharger 202 and turbogenerators 203a, 203b, 203c. The engine 201 also exhausts (via the valve 231) to a bypass value 232 which is provided in parallel with the turbogenerators 203a, 203b, 203c. By opening the bypass valve 232, the inlet pressure at inlets 226a, 226b, 226c is reduced and more of the exhaust gases from the engine 201 can be diverted away from the inlets 226a, 226b, 226c to reduce the pressure ratio and reduce the mass flow rate of gases through all of the generators 203a, 203b, 203c. Similarly, by closing the bypass valve 232, the inlet pressure at the inlets 226a, 226b, 226c is increased and more of the exhaust gases from the engine 201 enter the inlets 226a, 226b, 226c to increase the pressure ratio and increase the mass flow rate of gases through all of the generators 203a, 203b, 203c. It will be appreciated that the bypass valve 232 is not able to individually control the inlet pressure or mass flow rate of specific turbogenerators. Each of the turbogenerators 203a, 203b, 203c is provided with an associated power converter 205a, 205b, 205c which is able to convert power generated by the turbogenerators 203a, 203b, 203c into a form that can be injected into the utility electrical grid network. The turbogenerators 203a, 203b, 203c each comprise a turbine 224a, 224b, 224c, having the inlet 226a, 226b, 226c for receiving fluid from the engine 201 and an outlet for exhausting fluid to atmosphere (it will be noted that in FIG. 8 all of the outlets are joined together, and to the outlet of the valve 232). Each turbogenerator 203a, 203b, 203c also comprises an alternator 204a, 204b, 204c arranged on an output shaft of its respective turbine 224a, 224b, 224c for the conversion of shaft power into electrical power, and each alternator 204a, 204b, 204c is connected by way of an electrical connection a respective power converter 205a, 205b, 205c, which supplies an electrical output, as shown, to a utility electrical grid network. The power converters 205a, 205b, 205c may be of the same type and function as the power convertor 5 of FIG. 1.

The operation of the array of turbogenerators 203a, 203b, 203c is controlled by a controller 240, which is connected to each of the power converters 205a, 205b, 205c, and to the valve 232. Each power converter 205a, 205b, 205c is able to provide the controller 240 with an indication of the current speed of rotation of its respective turbine 224a, 224b, 224c, although in an alternative embodiment the speed of rotation is instead measured directly by sensors at the turbines 224a, 224b, 224c. The controller 240 is able to slow down or speed up the rotational speed of each turbine 224a, 224b, 224c by causing one (or more) power converter 205a, 205b, 205c to adjust the electrical load on its respective alternator 204a, 204b, 204c. As with FIG. 1, in order to slow down a turbine, the electrical load is increased, and in order to speed up the turbine the electrical load is reduced. The controller 240 is therefore able to control the speed of rotation of the turbines for the purposes which will be described in detail below. It should be understood that the controller 240 is able to control the speed of each turbine independently from the others. The controller 240 is also able to control the bypass valve 232 to increase or decrease the amount of exhaust gases passing through the array of turbogenerators, thereby changing the total mass flow rate.

If two or more turbogenerators are placed in parallel with each other, as is the case with FIGS. 7 and 8, it is possible that the power generated by and output from each turbogenerator will be slightly different, due to pipework variations and production tolerances. Each turbogenerator is individually rated to be able to output up to a particular amount of power without being damaged. In the systems described above in relation to FIGS. 7 and 8, the total mass flow rate through the array of turbogenerators can be controlled using a bypass valve. However, in using such a valve it is important that the amount of exhaust gases fed to the parallel turbogenerators must not cause any of the turbogenerators to exceed its individual maximum power rating. As a result, the power output from the combination of multiple turbogenerators will be limited by the one that generates the most power (for a given exhaust output from the engine). In other words, in setting the mass flow rate at a level which is the highest permitted without causing one (or more) of the turbogenerators to exceed its rated output, others of the turbogenerators may be operating below their rated output.

The present embodiment recognises that by individually altering the speed of each of the turbogenerators connected in parallel, it is possible to match their power outputs. As a result, speed control can be used to achieve a balanced power output across the plurality of turbogenerators, while inlet pressure and overall mass flow rate control (via a bypass valve for example) can be used to achieve maximum power output. This enables, in principle, all of the turbogenerators to operate at maximum power output at the same time, substantially all of the time (subject to the engine providing enough exhaust gases to both run the turbocharger and all of the turbogenerators). As can be seen from FIGS. 7 and 8, the controller 140, 240 is able to individually control rotor speed by way of the power convertors 105a, 105b, 105c, 205a, 205b, 205c, and to control overall mass flow rate via the valve 132, 232.

Referring to FIG. 9, an example is shown of two turbogenerators that are placed in parallel, with the second turbogenerator (TG2) having 5 kPa less pressure at its inlet due to higher pipework losses. FIG. 9 is a graph in which expansion ratio is plotted along its horizontal axis, and power output is plotted along its vertical axis. The relationship between expansion ratio and power for each of four different turbine speeds is shown. Both turbogenerators are, in FIG. 9, being run at their "ideal" reduced speed of 1500 rpm/sqrt·K, between the $3^{rd}$ and $4^{th}$ engine speeds. The "ideal" speed may for example be the speed at which, in a system that does not require balancing (that is, that there is no pressure or mass flow difference between the turbogenerators), the turbogenerators operate at the highest efficiency (option 1), or have a maximum power output (option 2). In the latter case, the ideal speed could be calculated using the techniques described above in relation to the first embodiment. Alternatively, the ideal speed could be pre-set. The chosen speed in the present case is as shown in FIGS. 9 and 10, that is 1500 rpm/sqrt·K.

The graph of FIG. 9 shows that when both of the turbogenerators are run at this speed, the total output from both turbogenerators is limited by the turbogenerator generating 60 kW (max rating) to only 112 kW (combined mass flow of 1.63 kg/s). This is based on the first turbogenerator operating with an expansion ratio of E1 and the second turbogenerator operating with a lower expansion ration of E2. The main cause for the turbogenerators generating a different amount of power is the different mass flow going through each turbine, which is related to the expansion ratio for that turbogenerator (this principle was discussed above in relation to FIG. 5). Other factors include pressure ratio (also influenced by changing the rotor speed, and by controlling the bypass valve) and efficiency, which may be a function of rotor speed and pressure ratio. The relationship between output power and mass flow rate was discussed above in relation to Equation (2). The graph of FIG. 10 has expansion ratio plotted along its horizontal axis and mass flow rate (in kg/s) plotted on its vertical axis. It can be seen that the first turbogenerator (TG1), having the expansion ratio of E1, has a mass flow rate of 0.84 kg/s, while the second turbogenerator (TG2), having the expansion ratio of E2, has a mass flow rate of 0.79 kg/s, based on the same engine speeds as for FIG. 9. This provides the combined mass flow rate of 1.63 kg/s, resulting in the combined power output of 112 kW (based on Equation (2) for example). FIG. 11 plots expansion ratio (horizontal axis) against mass flow (vertical axis), similarly to FIG. 10. FIG. 11 shows that, if the first turbogenerator (TG1) is sped up to a reduced speed of 1640 rpm/sqrt·K and the second turbogenerator (TG2) is slowed down to a reduced speed of 1400 rpm/sqrt·K, the mass flows through each turbogenerator in this case become more similar, with the first turbogenerator (TG1) receiving 0.81 kg/s and the second turbogenerator (TG2) receiving 0.82 kg/s. It will be appreciated that the total mass flow (1.63 kg/s) remains the same (in general there may be deviations from this due to the complex relationship between mass flow, pressure ratio and rotor speed. The effect of this change, as shown in FIG. 12 (which describes the relationship between expansion ratio and power output in like manner to FIG. 9), is to bring the power output of each turbogenerator to a similar value. In the case of FIG. 12, the overall mass flow rate has also been increased, so that both turbogenerators are operating at their maximum rated power output of 60 kW. Note that the mass flows for TG1 and TG2 may not need to be identical to achieve matched power output due to differences in their operating conditions.

Referring to FIG. 13, the control loop utilising the above principle is schematically illustrated by way of a flow diagram. At a step V1, the turbogenerator having the highest output (or more generally the turbogenerator having the output closest to its maximum power output rating, which may be different where turbogenerators having different ratings are used), is selected. This selection is made using the measured output power of each turbogenerator, which is available at the controller 140, 240 from the power convertors associated with each turbogenerator. It will be appreciated that, in some cases more than one of the turbogenerators may provide the same power output (or be the same distance from its rating), in which case each of these is selected. It is then determined at a step V2 whether the selected turbogenerator(s) are currently operating at their maximum power rating. If not, then the control loops returns to the step V1, since it is then deemed that there is no need to balance the power outputs of the turbogenerators since none of the turbogenerators is currently a limiting factor in overall power output. However, it will be appreciated that a mode of operation might be used in which turbogenerator power output is balanced even if the step V2 is answered in the negative—for example so that in the case of an increase in the available exhaust gases, these can immediately be delivered to the array of turbogenerators.

In any case, returning to the example of FIG. 13, if at the step V2 it is determined that the current power output of the turbogenerator(s) selected at the step V1 is at the maximum power rating of that/those turbogenerators, then at a step V3 it is determined whether (at least one of) the turbogenerator(s) are currently operating at their maximum allowable speed. If not, then at a step V4 the speed of the selected turbogenerator(s) is increased (potentially up to the maximum allowable speed). The speed increase may be by a fixed increment, or may be variably set in dependence on e.g. an increase required in order to equalise the mass flows between the turbogenerators—for example using a look up table. If at the step V3 it is determined that at least one of the selected turbogenerator is currently operating at its maximum allowable speed (and can therefore not be sped up), then at a step V5 the speed of the non-selected turbogenerators (that is, those determined at the step V1 not to have the highest power output, or not to be closest to their maximum rating) is decreased. Either of the steps V4 or V5 will have the result of reducing the mass flow rate through the selected turbogenerators and increasing the mass flow rate through the non-selected turbogenerators. Accordingly, at a step V6 the turbogenerator speed change leads to a power output change for the turbogenerators, effectively shifting power outputs between the turbogenerators. As a result of this, the selected turbogenerators should be outputting power below their maximum rating, providing headroom above this to receive increased mass flow. Accordingly, at a step V7, if possible the total mass flow is increased, thereby increasing the total amount of power generated by the combination of turbogenerators. The control loop then returns to the step V1, where the new power output levels of the turbogenerators are measured and used to progress through the next iteration of the control loop of FIG. 13. It will be appreciated that, at its simplest, the control loop can be carried out using only power output levels and current turbine speeds as inputs. It will be appreciated that it may often be the case that in order to balance power outputs increasing the speed of the highest power turbogenerator(s) may not be enough. In this case, once the control loops has pushed the speed of the highest power turbogenerator(s) up to the maximum level (potentially by way of several iterations of the control loop), the step V3 will switch from "No" to "Yes", and the other turbogenerators will then be slowed down.

The control loop is intended to stabilise (that is, to reach a state at which it will not increase or decrease the speed of any turbogenerators) once all turbogenerator power outputs are matched (at their maximum power rating), or if none of the turbogenerators are operating at their maximum rating. So, when the engine starts, the bypass valve may be closed to drive all exhaust gases through the turbogenerator array, and the control loop may do nothing (terminating at the step V2) until the exhaust gas flow rate reaches a level at which one of the turbogenerators reaches its maximum rating, or at least approaches a predetermined power output level (which may be defined as a certain distance below the maximum rating of the turbogenerator). At that point the speed control steps V3, V4 and V5 will increase the speed of the highest power turbogenerator relative to the other turbogenerators (either using the step V4 or V5) in order to balance the power output of the turbogenerators to permit more mass flow (total) to pass through the turbogenerators to permit a higher overall power output to be achieved. If the turbogenerators are all running (equally) at maximum, then the bypass valve will be opened to stop the mass flow rate going any higher and overloading the turbogenerators. If subsequently the exhaust gas pressure drops, the bypass valve will close off to compensate and retain maximum power for as long as possible.

The invention claimed is:

1. A method of operation of a turbogenerator system, the turbogenerator system comprising a plurality of turbogenerators provided in parallel and in fluid communication with a gas stream, the method comprising:
identifying one or more turbogenerator of the plurality of turbogenerators which are currently operating closest to a maximum power output of the one or more turbogenerator; and
in response to a determination that a power output of an identified turbogenerator is at or near a maximum power output of the identified turbogenerator, adjusting, by at least one controller configured to change a load on one or more of the plurality of turbogenerators, a speed of one or more of the plurality of turbogenerators to cause the power outputs of the plurality of turbogenerators to become more similar, wherein adjusting the speed comprises one or both of increasing the speed of the identified one or more turbogenerator or decreasing the speed of at least one turbogenerator that is not an identified one or more turbogenerator.

2. The method according to claim 1, wherein adjusting the speed comprises decreasing the speed of all turbogenerators of the plurality of turbogenerators not identified as currently operating closest to a maximum power output of the one or more turbogenerator.

3. The method according to claim 1, wherein adjusting the speed comprises increasing the speed of the identified one or more turbogenerator if the identified one or more turbogenerator is operating below a predetermined speed, and decreasing the speed of at least one turbogenerator of the plurality of turbogenerators not identified as currently operating closest to a maximum power output of the one or more turbogenerator if one or more of the identified turbogenerators are not operating below the predetermined speed.

4. The method according to claim 1, further comprising increasing the total flow rate of gas through the plurality of turbogenerators after the power output of the identified one or more turbogenerator has reduced.

5. The method according to claim 4, wherein the step of increasing the total flow rate of gas through the plurality of turbogenerators continues until either one or more of the turbogenerators has a power output closest to the maximum power output of the one or more of the turbogenerators, or until the total flow rate reaches a maximum level.

6. The method according to claim 4, wherein the increase in the total flow rate of the gas is controlled by a valve.

7. The method according to claim 6, wherein the valve is a bypass valve disposed in parallel with the plurality of turbogenerators, and wherein the increase in the total flow rate of the gas is achieved by closing the bypass valve to reduce the flow of gases through the bypass valve and thereby increase the flow of gases through the plurality of turbogenerators.

8. The method according to claim 1, wherein each of the plurality of turbogenerators has the same maximum power output, and identifying one or more turbogenerator of the plurality of turbogenerators which are currently operating closest to the maximum power output of the one or more turbogenerator comprises identifying one or more turbogenerator of the plurality of turbogenerators which currently has the highest power output.

9. The method according to claim 1, wherein adjusting the speed of a turbogenerator comprises adjusting a load on the turbogenerator.

10. The method according to claim 1, wherein the turbogenerator system is an electric turbocompounding system comprising a turbocharger arranged in fluid communication with an engine, wherein the plurality of turbogenerators are arranged either in series with or in parallel to the turbocharger.

11. The method according to claim 1, wherein the gas stream is a stream of exhaust gases from an engine.

12. A turbogenerator system comprising:
 a plurality of turbogenerators provided in parallel and in fluid communication with a gas stream; and
 a controller operable to identify one or more turbogenerator of the plurality of turbogenerators which is currently operating closest to a maximum power output of the one or more turbogenerator, and, in response to a determination that a power output of an identified turbogenerator is at or near a maximum power output of the identified turbogenerator, adjust the speed of one or more of the plurality of turbogenerators to reduce the power output of the identified turbogenerators, wherein the controller is operable to adjust the speed by one or both of increasing the speed of the identified one or more turbogenerator or decreasing the speed of at least one turbogenerator that is not an identified one or more turbogenerator.

13. A computer readable medium having instructions which, when run on a computer, cause the computer to:
 identify one or more turbogenerator of a plurality of turbogenerators which is currently operating closest to a maximum power output of the one or more turbogenerator, wherein the plurality of turbogenerators are provided in parallel and in fluid communication with a gas stream; and
 in response to a determination that a power output of an identified turbogenerator is at or near a maximum power output of the identified turbogenerator, adjust a speed of one or more turbogenerator of the plurality of turbogenerators to cause the power outputs of the plurality of turbogenerators to become more similar, wherein adjusting the speed comprises one or both of increasing the speed of the identified one or more turbogenerator or decreasing the speed of at least one turbogenerator that is not an identified one or more turbogenerator.

* * * * *